US011769529B2

United States Patent
Paglia et al.

(10) Patent No.: US 11,769,529 B2
(45) Date of Patent: *Sep. 26, 2023

(54) STORYLINE EXPERIENCE

(71) Applicant: Google LLC, Mountain View, CA (US)

(72) Inventors: Marco Paglia, San Francisco, CA (US); William Frederick Kiefer, Seattle, WA (US); Jokubas Zukerman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,048

(22) Filed: May 24, 2021

(65) Prior Publication Data

US 2021/0280219 A1 Sep. 9, 2021

Related U.S. Application Data

(63) Continuation of application No. 16/908,631, filed on Jun. 22, 2020, now Pat. No. 11,017,813, which is a (Continued)

(51) Int. Cl.
*G06F 17/00* (2019.01)
*G11B 27/031* (2006.01)
*G11B 27/34* (2006.01)

(52) U.S. Cl.
CPC .......... *G11B 27/031* (2013.01); *G11B 27/34* (2013.01)

(58) Field of Classification Search
CPC .. G11B 27/031; G11B 27/34; G06F 17/30017
(Continued)

(56) References Cited

U.S. PATENT DOCUMENTS 5,892,507 A * 4/1999 Moorby ................. G11B 27/34
715/205
6,976,229 B1 * 12/2005 Balabanovic ........ G11B 27/031
(Continued)

OTHER PUBLICATIONS

Ajanki, Adaptive Timeline Interface to Personal History Data, 2013, ACM http://dx.doi.org, (Year: 2013).*
(Continued)

*Primary Examiner* — Stephen S Hong
*Assistant Examiner* — Matthew J Ludwig
(74) *Attorney, Agent, or Firm* — Lowenstein Sandler LLP

(57) ABSTRACT

A processing device provides, on a mobile device, a storyline content user interface (UI) for adding video content to a storyline, the storyline content UI having a first area allowing video playback, a second area including visual representations of video clips of one or more storylines, and a third area including a first UI element to record video content. In response to a user activation of the first UI element, the processing device causes recording of a new video clip to be initiated, determines that a duration of the new video clip satisfies a predetermined threshold, creates a visual representation of the new video clip, associates the new video clip with an additional storyline, and adds the visual representation of the new video clip to the second area. In response to a user selection of the visual representation of the new video clip in the second area of the storyline content UI, the processing device causes the new video clip to be associated with the storyline. In response to a user selection of the visual representation of the new video clip, the processing device plays, in a predetermined order on the mobile device, the new video clip and at least one of the video clips having the visual representations in the second area.

20 Claims, 12 Drawing Sheets

Related U.S. Application Data continuation of application No. 14/877,541, filed on Oct. 7, 2015, now Pat. No. 10,692,533.

(58) Field of Classification Search
USPC .......................................................... 715/202
See application file for complete search history.

(56) References Cited

U.S. PATENT DOCUMENTS

| | | | | |
|---|---|---|---|---|
| 8,887,050 | B1* | 11/2014 | Siracusano, Jr. | G06F 3/0481 |
| | | | | 715/756 |
| 9,377,991 | B1 | 6/2016 | Rapport | |
| 9,423,928 | B1 | 8/2016 | Bolfo et al. | |
| 9,595,021 | B2 | 3/2017 | Bennett | |
| 9,870,802 | B2* | 1/2018 | Carson | H04N 21/472 |
| 10,162,506 | B2* | 12/2018 | Meehan | H04N 21/8549 |
| 10,565,246 | B2* | 2/2020 | Kunieda | G06F 16/489 |
| 10,652,605 | B2* | 5/2020 | Tobin | H04N 21/4756 |
| 10,656,789 | B2* | 5/2020 | Joshi | G06F 3/04842 |
| 2004/0001079 | A1 | 1/2004 | Zhao et al. | |
| 2007/0003223 | A1 | 1/2007 | Armstrong et al. | |
| 2007/0118801 | A1 | 5/2007 | Harshbarger et al. | |
| 2008/0075430 | A1 | 3/2008 | Bromley et al. | |
| 2008/0215546 | A1 | 9/2008 | Baum et al. | |
| 2011/0191361 | A1 | 8/2011 | Gupta et al. | |
| 2011/0194839 | A1* | 8/2011 | Gebert | G11B 27/034 |
| | | | | 386/E5.028 |
| 2012/0117473 | A1 | 5/2012 | Han et al. | |
| 2012/0210200 | A1 | 8/2012 | Berger et al. | |
| 2012/0210221 | A1* | 8/2012 | Khan | H04N 5/2628 |
| | | | | 715/716 |
| 2012/0308209 | A1 | 12/2012 | Zaletel | |
| 2012/0323891 | A1 | 12/2012 | Jacobson et al. | |
| 2013/0080224 | A1 | 3/2013 | OBrien et al. | |
| 2013/0124996 | A1 | 5/2013 | Margulis | |
| 2013/0151965 | A1* | 6/2013 | Demiris | G11B 27/34 |
| | | | | 715/716 |
| 2013/0223818 | A1 | 8/2013 | Wayans | |
| 2013/0227384 | A1 | 8/2013 | Good et al. | |
| 2013/0318236 | A1 | 11/2013 | Coates et al. | |
| 2014/0019865 | A1 | 1/2014 | Shah | |
| 2014/0328574 | A1 | 11/2014 | Sandberg et al. | |
| 2014/0328575 | A1 | 11/2014 | Rodriguez et al. | |
| 2015/0020170 | A1* | 1/2015 | Talley | H04L 63/08 |
| | | | | 726/4 |
| 2015/0050009 | A1 | 2/2015 | Svendsen et al. | |
| 2015/0139613 | A1 | 5/2015 | Mondelore et al. | |
| 2015/0373281 | A1* | 12/2015 | White | G11B 27/34 |
| | | | | 348/660 |
| 2016/0088036 | A1 | 3/2016 | Corbin et al. | |
| 2016/0110063 | A1* | 4/2016 | Connolly | G06F 9/451 |
| | | | | 715/716 |
| 2016/0110901 | A1* | 4/2016 | Connolly | G06F 3/0482 |
| | | | | 345/661 |
| 2016/0217539 | A1 | 7/2016 | Strohofer et al. | |
| 2016/0239198 | A1 | 8/2016 | Shenkler | |
| 2017/0034583 | A1 | 2/2017 | Long et al. | |

OTHER PUBLICATIONS

Dillet, Romain; YouTube Founders Introduce MixBit to Crack the Code of Video Editing on Mobile, Tech Crunch, Aug. 8, 2013, 12 pages, http://techcrunch.com/2013/08/08/youtube-founders-introduce-mixbit-to-crack-the-code-of-video-editing-on-mobile/.

Goode, Lauren; Will You Use Skype's New Messaging App, Qik? Depends on Your Friends, <re/code>, Oct. 22, 2014, 4 pages, http://recode.net/2014/10/22/will-you-use-skypes-new-messaging-app-qik-depends-on-your-friends/.

\* cited by examiner

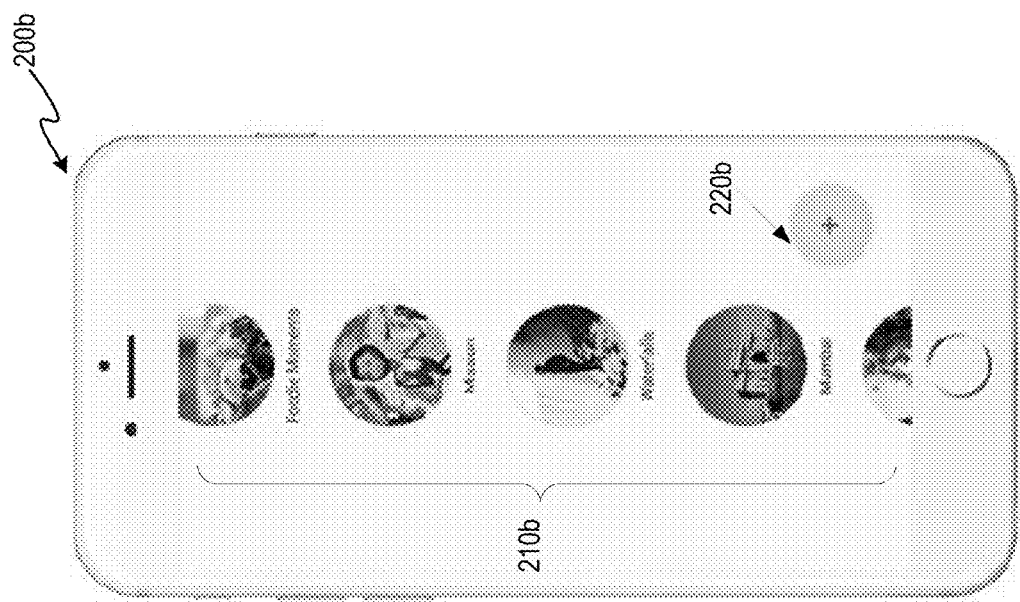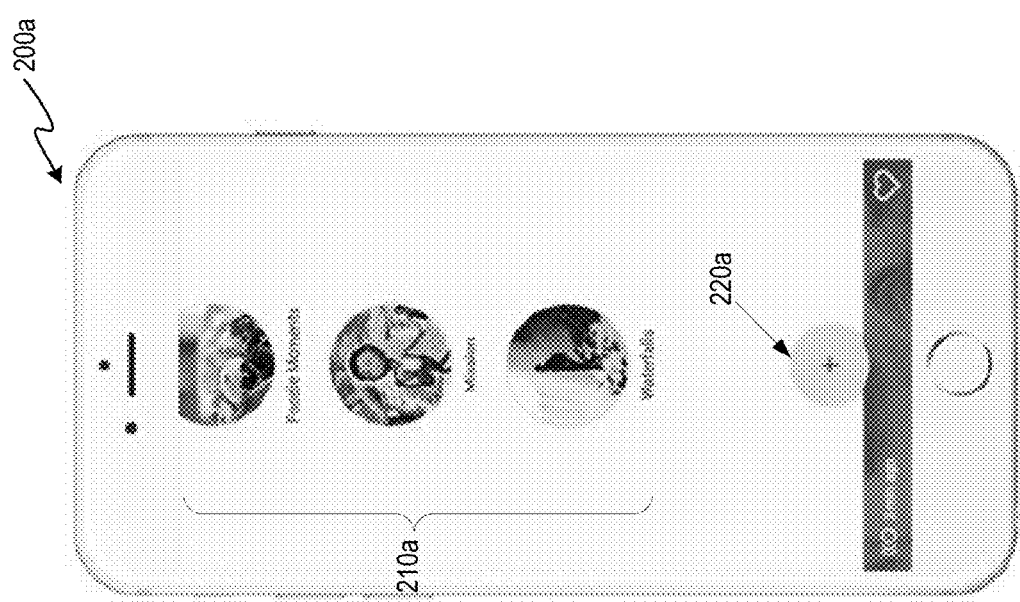
FIG. 2

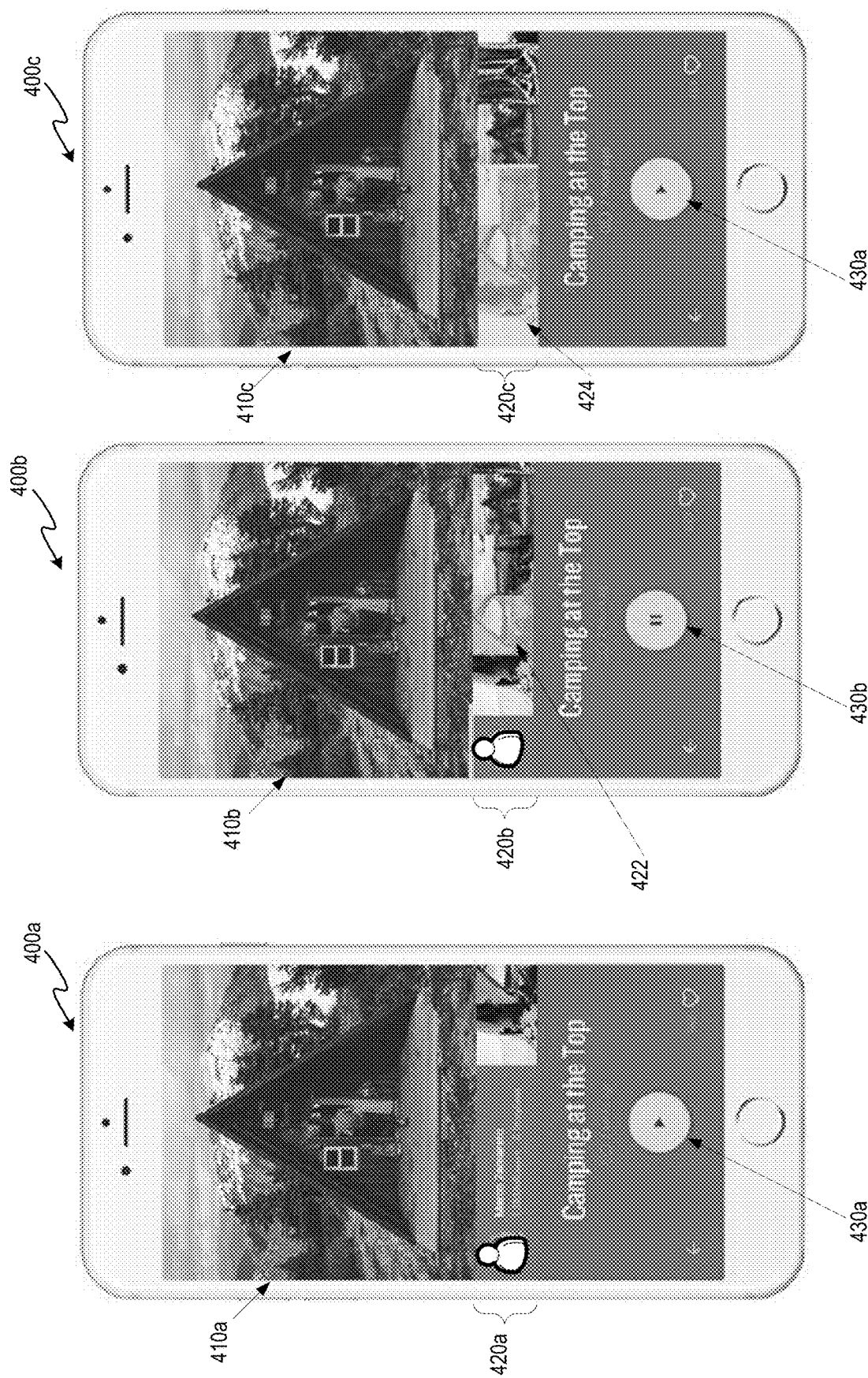

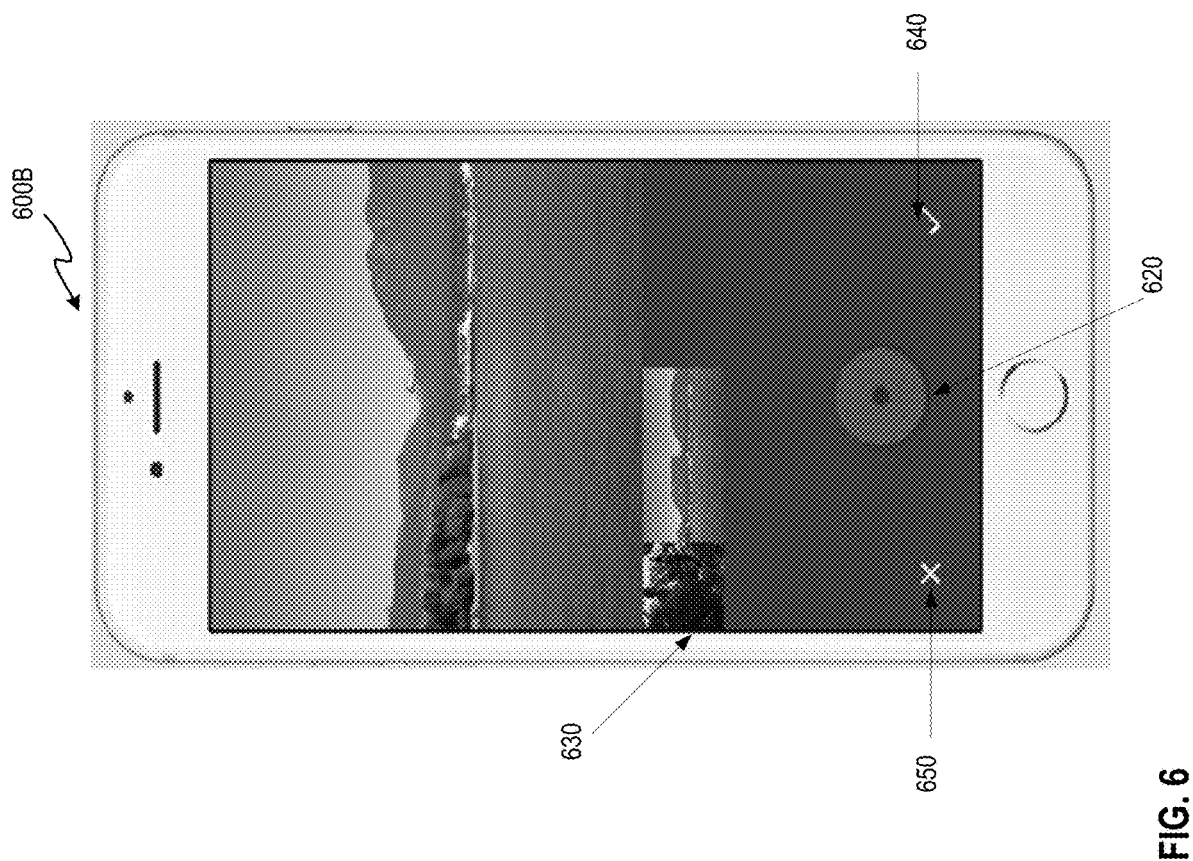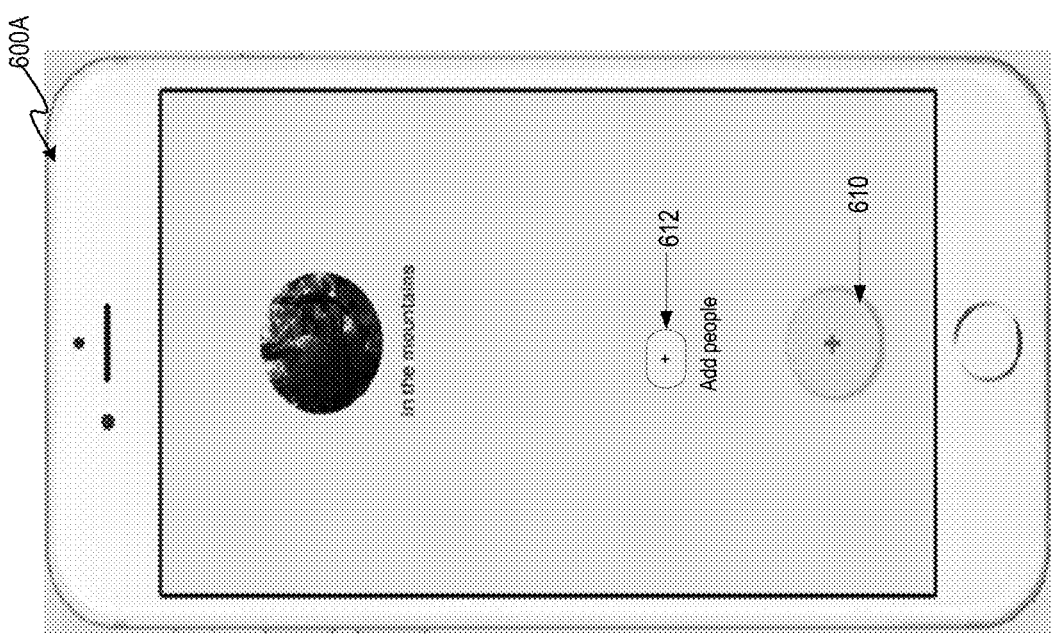
FIG. 6

985

Provide storyline content UI having first area including media player, second area including images of video clips, and third area including first UI element to record video content, second UI element to add recorded video content to storyline and third UI element to add other users to contribute to the storyline
992

In response to user activation of first UI element, initiate recording of new video clip using first area, create visual representation of new video clip, and add it to second area  994

In response to user activation of second UI element, cause new video clip to be associated with storyline  996

In response to user selection of visual representation of new video clip, play new video clip in first area  998

In response to user selection of third UI element, add more users to the storyline and share the storyline identifier with added users  999

FIG. 9B

STORYLINE EXPERIENCE

RELATED APPLICATIONS

This application is a continuation application of co-pending U.S. patent application Ser. No. 16/908,631, filed Jun. 22, 2020, which is a continuation application of U.S. patent application Ser. No. 14/877,541, filed Oct. 7, 2015, now U.S. Pat. No. 10,692,533, which is herein incorporated by reference.

TECHNICAL FIELD

This disclosure relates to the field of content processing and sharing and, in particular, to creating and sharing storyline content.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for creating and sharing storyline content is disclosed. The method includes providing, on a mobile device, a storyline content user interface (UI) for adding video content to a storyline, the storyline content UI having a first area including a media player, a second area including visual representations of video clips from the storyline, and a third area including a first UI element to record video content, and a second UI element to add the recorded video content to the storyline. The method also includes: in response to a user activation of the first UI element, initiating recording of a new video clip using the first area, creating, by a processing device, a visual representation of the new video clip, and adding the visual representation of the new video clip to the second area. The method further includes: in response to a user activation of the second UI element, causing the new video clip to be associated with the storyline; and in response to a user selection of the visual representation of the new video clip, playing the new video clip in the first area.

In one implementation, the method further includes monitoring a duration of the new video clip being recorded, and stopping the recording of the new video clip in response to determining that the duration of the new video clip has reached a predetermined threshold. In one implementation, the method further includes stopping the recording of the new video clip in response to a user re-activation of the first UI element.

In one implementation, the third area further includes a third UI element to add one or more additional users to the storyline, and the method further comprises causing an identifier of the storyline to be shared with the one or more additional users in response to a user activation of the third UI element, wherein sharing the identifier of the storyline allows the one or more additional users to contribute to the storyline.

In one implementation, the method further includes receiving a user request to share the storyline with one or more other users, and presenting information about the storyline to the one or more other users.

In one implementation, the method further includes presenting, to a user of the mobile device, a home screen UI including visual representations of storylines of the user and visual representations of additional storylines to which the user has subscribed. In one implementation, the method also includes receiving a user selection of a storyline on the home screen UI, and playing video clips of the selected storyline in the storyline content UI. In one implementation, the video clips are played sequentially using an order in which the video clips were created. In one implementation, playing the video clips of the selected storyline comprises playing one or more of the video clips that were not previously viewed by the user while graphically identifying, in the storyline content UI, visual representations of one or more of the video clips that were previously viewed by the user.

In one implementation, the method further includes providing, in an update UI, updates on the additional storylines to which the user has subscribed. In one implementation, the updates identify new video clips that have been added to the additional storylines from a last time the user viewed the update UI. In one implementation, the method further includes automatically playing the new video clips that have been added to the additional storylines in the update UI.

In additional implementations, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the present disclosure, a non-transitory computer-readable storage medium stores instructions for performing the operations of the above-described implementations.

BRIEF DESCRIPTION OF THE DRAWINGS

The present disclosure is illustrated by way of example, and not by way of limitation, in the figures of the accompanying drawings.

FIGS. 2-8 are example screenshots illustrating user interfaces for creating and sharing storyline content in accordance with one implementation of the disclosure.

FIG. 9B is a flow diagram illustrating a client-side method for creating storyline content, according to some implementations of the disclosure.

DETAILED DESCRIPTION

Figure 1:
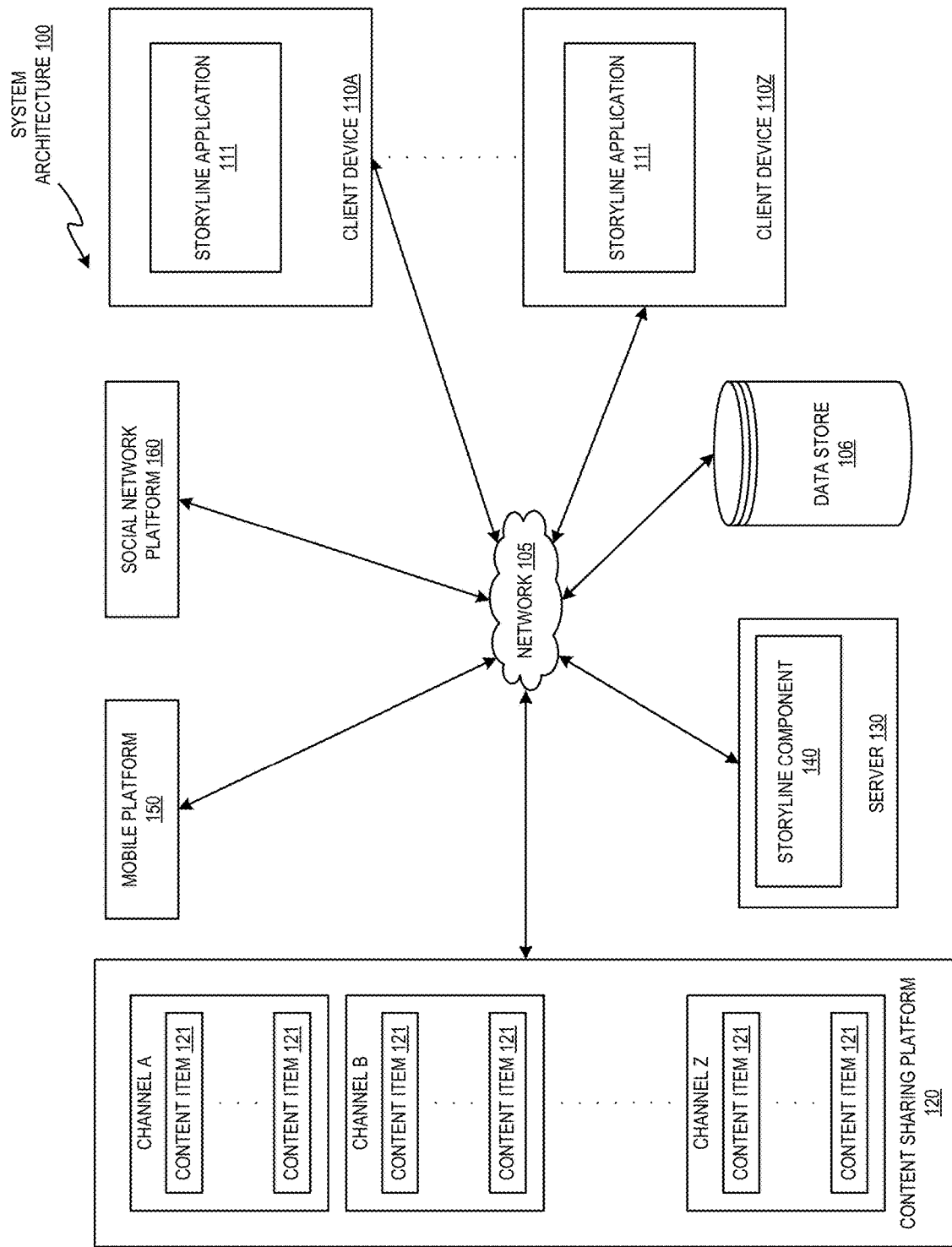
FIG. 1 illustrates an example of a system architecture, in accordance with one implementation of the disclosure.

Aspects and implementations of the disclosure are directed to creating and sharing of storyline content. A storyline can be a collection of content items such as video clips that have a common theme (e.g., pertain to the same event, time frame, subject, source, or the like). For example, a storyline may be a collection of video clips reflecting a user's visits of different places during the user's vacation. In another example, a storyline may be a collection of video clips focusing on different presentations during a conference attended by a user. In yet another example, a storyline may be a collection of video clips showing highlights of a sporting event attended by a user.

Currently, there is no convenient mechanism for capturing and sharing video content. For example, capturing and sharing a video may require many steps such as opening a camera, selecting a video mode, recording a video, stopping the recording, uploading the recorded video to a content sharing platform and then sharing the video via a separate user interface. In addition, videos captured by smart phones are usually too long from a viewer perspective and are hard to share in real-time.

Aspects of the present disclosure address the above and other deficiencies by providing a storyline application that allows a user to capture short videos as part of a storyline and to share content of these storylines in real-time. The term "real-time" indicates that capturing of content shared by one user and receipt of shared content by another user occurs within a specified time constraint (e.g., under 50 microseconds).

According to aspects of the present disclosure, a user can create a new storyline at any time and/or add new video clips to an existing storyline at any time. A new video clip can be captured by activating (e.g., pressing) a "record" button and can be limited to a certain short duration (e.g., 15 seconds). A storyline can contain an unlimited number of video clips, and a user can request that a storyline be played from any point and be switched from one point to another. When a storyline is playing, the clips from this storyline can be played sequentially based on the time they were captured and/or added to the storyline.

Users can allow their storylines to be viewed by other users who can follow (e.g., subscribe to) any of the storylines and receive updates about such storylines. When a follower checks the updates for the storylines being followed, new video clips, which have been added to the storylines since the last time the follower checked the updates, can be played sequentially to the follower. A storyline can have a single storyline owner who can create the storyline and add video clips to the storyline, which can be viewed by the followers of the storyline owner. Alternatively, a storyline can be a collaborative story with multiple storyline owners/collaborators. For example, a first user can create a storyline, and share it with other users who can also add video clips to the storyline, which can be viewed by the followers of the storyline owners/collaborators. The collaborators can be a limited group of users (e.g., specified users or contacts of the user) or any user of the content sharing platform.

According to aspects of the present disclosure, the storyline application can be a mobile application that can be easily accessed on a mobile device of a user to quickly and conveniently capture ongoing stories related to the user's surroundings. In some implementations, many steps that were previously required to capture and share video content are no longer needed. For example, rather then opening a camera, selecting a video mode, recording a video, stopping the recording, uploading the recorded video and then sharing it, the user can simply open the storyline application, select a record button to capture a new video clip, and select an add button on the same screen to add the new video clip to a storyline previously shared with the user's contacts. The user's contacts can then be able to view the recent storyline updates and watch the new video clip. As such, the user's contacts can follow what is going on with the user in a quick and convenient way, and through the rich experience of videos. In some implementations, the user's contacts can also contribute to the storyline created by the user, thereby providing a fun collaborative experience resulting in more complete storylines.

As referred to herein, a contact of a user can be any other user that is connected to the user via a content sharing platform, a mobile platform, a social network platform, an email service, a phone service, and/or any other platform or service. Examples of a contact of the user can include a "friend," a "follower," a "subscriber," a "connection," a "phone contact," etc.

The present disclosure often references videos or video clips for simplicity and brevity. However, the teaching of the present disclosure are applied to content items generally and can be applied to various types of content or content items, including for example, video, audio, text, images, program instructions, etc. The content items referred to herein represent viewable and/or shareable content items.

FIG. 1 illustrates an example of a system architecture 100, in accordance with one implementation of the disclosure, for content sharing using storylines. The system architecture 100 includes client devices 110A through 110Z, a network 105, a data store 106, a content sharing platform 120, a server 130, and a mobile platform 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, wearable device, smart phones, tablet computers, netbook computers etc. In some implementations, client devices 110A through 110Z may also be referred to as "user devices." Each client device includes a storyline application 111. In one implementation, the storyline applications 111 may be applications that allow users to capture and/or view content, such as images, videos, web pages, documents, etc. For example, the storyline application 111 may be a web browser that can access, retrieve, present, and/or navigate content (e.g., web pages such as Hyper Text Markup Language (HTML) pages, digital media items, etc.) served by a web server. The storyline application 111 may render, display, and/or present the content to a user. The storyline application 111 may also display an embedded media player (e.g., a Flash® player or an HTML5 player) that is embedded in a web page (e.g., a web page that may provide information about a product sold by an online merchant). In another example, the storyline application 111 may be a standalone application (a mobile application or an app) that allows users to capture and/or view digital media items (e.g., digital videos, digital images, electronic books, etc.).

The storyline applications 111 may be provided to the client devices 110A through 110Z by the server 130 and/or content sharing platform 120. For example, the storyline applications 111 may be and/or include embedded media players that are embedded in web pages provided by the content sharing platform 120. In another example, the storyline applications 111 may be and/or include applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. An activity feed may be a list of recent activity associated with the user and occurring on the social network. If a user subscribes to multiple channels, the activity feed for each channel to which the user is subscribed can be combined into a syndicated activity feed. Information from the syndicated activity feed can be presented to the user. Although channels are described as one implementation of a content sharing platform, implementations of the disclosure are not limited to content sharing platforms that provide content items via a channel model.

Each channel may include one or more content items 121. Examples of a content item 121 can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via the Internet and/or via a mobile device application. As used herein, "media," "media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

Mobile platform 150 may be and/or include one or more computing devices (e.g., servers), data stores, networks, software components, and/or hardware components that may be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, video chat, and/or any other communication between users.

The mobile platform 150 may present to a user a listing (e.g., activity feed, feed, stream, wall, etc.) of objects (e.g., posts, content items (e.g., videos, images, audios, etc.), status updates, favorability indications, tags, messages, etc.) generated by other users of the mobile platform. The mobile platform 150 may also include a content sharing aspect that allow users to upload, view, tag, share, and/or perform any other function on content, such as text content, video content, image content, audio content, etc. Other users of the mobile platform 150 may comment on the shared content, discover new content, locate updates, share content, and otherwise interact with the provided content.

In one implementation, the content sharing platform 120 may be integrated with the mobile platform 150. For example, the mobile platform 150 may use the content sharing platform 120 to provide users with content sharing, content storage, content streaming, content processing, and/or any other service. In one example, a user of the mobile platform 150 may upload and/or share content via the content sharing platform 120. In another implementation, the mobile platform 150 may be separate from the content sharing platform 120.

In one implementation, the server 130 may be one or more computing devices (e.g., a rackmount server, a server computer, etc.). In one implementation, the server 130 may be included in the content sharing platform 120 and/or the mobile platform 150. In another implementation, the server 130 may be separate from the content sharing platform 120 and/or the mobile platform 150 but may communicate (e.g., exchange data with) the content sharing platform 120 and/or the mobile platform 150.

In one implementation, the server 130 may include a storyline component 140. Each of client devices 110A-110Z can include a storyline application 111. The storyline component 140 and/or the storyline application 111 can provide various content sharing functions. For example, the storyline component 140 and/or the storyline application 111 can provide one or more user interfaces to prompt a user of the client device 110 to capture content items (e.g., video clips), create a storyline, upload content items to the storyline, share the storyline, follow one or more storylines, review updates about the storylines, etc.

In one implementation, a user (also referred to herein as the "creator user") may initiate creation of a storyline using the storyline application 111. For example, the storyline application 11 can receive a user input that initiates the creation of the storyline. The storyline application 111 can then transmit a request to create the storyline to the storyline component 140. The request can include any suitable information related to the storyline to be created, such as a description of the storyline, one or more content items associated with the storyline (e.g., video clips, images, etc.), a user identifier of the creator user, etc. Upon receiving the request to create the storyline, the storyline component 140 can create the storyline. For example, the storyline component 140 can generate an identifier that identifies the storyline (also referred to herein as "storyline identifier"). As another example, the storyline component 140 can generate an object for the storyline. The storyline component 140 can also store information related to the storyline in association with the storyline identifier and/or the object.

The storyline application 111 and/or the storyline component 140 can update the storyline based on content items uploaded by one or more users (e.g., the creator user, one or more contacts of the creator user, one or more users that follow the storyline, etc.). For example, the storyline application 111 can generate a content item to be associated with the storyline. More particularly, for example, the storyline application 111 can cause a video clip to be recorded using a camera of the client device 110. The storyline application 111 can also process the recorded video clip using suitable video processing techniques.

The storyline application 111 can then transmit, to the storyline component 140, a request to associate the content item with the storyline. The request can include any data about the content item, such as data that can be used to provide playback of the content item (e.g., audio data, video data, metadata, etc.). The request can also include the storyline identifier and/or any other information that identifies the storyline.

Upon receiving the request to associate the content item and/or the data about the content item, the storyline component 140 can associate the content item with the storyline. For example, the storyline component 140 stores the data about the content item in association with the object and/or the storyline identifier corresponding to the storyline.

In some implementations, the storyline component 140 can associate multiple content items with the storyline. The multiple content items can be received from one or more client devices 110A-110Z at any time. In some implementations, each storyline can be associated with a collaboration attribute that indicates whether the storyline can only be updated by a single storyline owner (the creator of the storyline), by a group of storyline owners/collaborators (e.g., the creator of the storyline and other collaborators with whom the creator of the storyline has shared the storyline and optionally, additional users with whom the collaborators have shared the storyline), or by any user of the content sharing platform 120. For collaborative storylines, when a user submits a request to create a new storyline, the storyline component 140 creates a storyline identifier (e.g., a URL, a storyline name, etc.), and stores it in the data store 106, along with the identifier of the storyline creator and the collaboration attribute indicating that the storyline can have multiple owners who are allowed to add content items to the storyline. In some implementations, each storyline that can be updated by any user of the content sharing platform 120 ("public" storyline) can be associated with a story characteristic attribute in addition to or instead of the collaboration attribute. The story characteristic attribute can be, for example, a location (e.g., a particular country or city) or an event (e.g., a particular concert or a sporting event) associated with the storyline. In some implementations, the presence of the story characteristic attribute indicates that the storyline is public. The collaboration attribute and/or the story characteristic attribute can be specified by the storyline creator or can be set to a default value(s) by the storyline component 140.

When the storyline creator submits a request to share the storyline with other users (to add other users as owners of the storyline), the storyline component 140 can determine whether the collaboration attribute allows for such a collaboration. If so, the storyline component 140 can then provide the storyline identifier (e.g., the storyline URL) to the other users/collaborators who can then use the storyline identifier to add content items to the storyline. For example, a collaborator can use storyline application 111 on his or her client device 110 to add a content item (e.g., a video clip) to the storyline. In some implementations, each added collaborator can further request that one or more additional users be added to the list of owners of the storyline. In response to such a request, the storyline component 140 can provide the identifier of the storyline to each additional user (e.g., in a feed, notification, email message, text message, etc.).

In some implementations, the storyline application 110 can tag the content item with the identifier of the storyline (e.g., by adding the identifier of the storyline to metadata of the content item) and transmit the tagged content item to the storyline component 140. In other implementations, the storyline application 110 can transmit the content item and the identifier of the storyline to the storyline component 140, which can then store an association between the identifier of the storyline and the identifier of the content item in the data store 106. Alternatively, the storyline component 140 can tag the content item with the identifier of the storyline (e.g., by adding the identifier of the storyline to metadata of the content item) and store the tagged content item in the data store 106. In some implementations, a content item (e.g., a video clip) can be associated with multiple storylines. For example, tags of multiple storylines can be added to the metadata of a video clip.

The storyline component 140 can arrange the content items of a storyline by upload date and/or by collaborator and can provide the content items based on the upload dates and/or collaborators of the content items. For example, a user of the storyline application 111 may initiate a request for content of a particular storyline. The user may initiate such a request by selecting the particular storyline from storylines presented to the user. The presented storylines can be grouped into private storylines (where the user is the only owner), shared storylines (where the user is part of a limited group of collaborators), public storylines (where the user is one of many collaborators that can consist of all users of the content sharing platform 120), and storylines of others that are followed by the user. Public storylines can be presented based on a story characteristic attribute, which can be, for example, a location (e.g., a particular country or city) or an event (e.g., a particular concert or a sporting event). The story characteristic attribute can be specified by the user via the GUI of the storyline application 111 or determined by the storyline application 111 or the storyline component 140 automatically using current information pertaining to the user (e.g., the user's current location or the event that the user is currently attending) or information (e.g., places visited by the user or events attended by the user) from other applications and platforms (e.g., social network platform 160, email system, calendar application, travel services, ticketing applications, etc.).

Upon receiving user input identifying a storyline, the storyline application 111 can transmit, to the storyline component 114, a request for content of the storyline. The request can include any suitable information, such as a user identifier associated with the user that initiates the request, the identifier of the storyline, etc.

Upon receiving the request, the storyline component 140 can retrieve the requested storyline content and provide it to the storyline application 111. For example, the storyline component 140 can determine one or more of content items that are associated with the storyline and that have not been previously consumed by the user that initiated the request. The storyline component 140 can then transmit, to the storyline application 111, data for presentation of information related to the storyline (e.g., data to be used to render one or more user interfaces, data to be used to provide playback of the content items, etc.). In some implementations, the storyline application 111 can automatically provide playback of the content items that have not been consumed by the user.

As discussed above, in some implementations, the user may be presented with multiple storylines. Such a presentation may be provided in response to a user request for content related to multiple storylines. The storyline application 111 can send the request to the storyline component 140. Upon receiving the request, the storyline component 140 can determine one or more storylines associated with the user. Examples of storylines associated with the user include a storyline that is created or contributed to by the user, a storyline that is created by a contact of the user or contributed to by a contact of the user, a storyline that is followed by the user, and/or any other storyline that can be regarded as being associated with the user.

The storyline component 140 can also determine one or more content items that are part of the storylines associated with the user. For example, the storyline component 140 can determine one or more content items that are associated with the storylines and that have not been consumed by the user. The storyline component 140 can then determine a playback order of the content items. For example, the playback order can be determined based on upload dates of the content items.

The storyline component 140 can provide data for playback of the content items to the storyline application 111. Such data can include, for example, video data and/or audio data that can be used to provide playback of the content items, information about the playback order, etc. In some implementations, the storyline application 111 can provide playback of the content items by upload date using the data provided by the storyline component 140.

Although implementations of the disclosure are discussed in terms of content sharing platforms and promoting social network sharing of a content item on the content sharing platform, implementations may also be generally applied to any type of social network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120, the server 130, the mobile platform 150, and/or any other component of the system 100.

FIG. 2 illustrates examples of user interfaces 200*a* and 200*b* for providing information related to one or more storylines. User interface 200*a* and 200*b* can be home screen UIs of a storyline application that a user can see upon starting the storyline application. As illustrated, user interfaces 200*a* and 200*b* can include one or more visual representations 210*a*-210*b* corresponding to one or more storylines, UI elements in the form of buttons 220*a* and 220*b* for creating a storyline, and/or any other UI elements for presentation of information related to storylines. Each of the visual representations 210*a* and 210*b* can include any information related to a storyline and can include any content (e.g., text, one or more images, video content, audio content, graphics, etc.). In one example, each of visual representations 210*a*-*b* can include an image (e.g., a thumbnail image) representative of a storyline. In another example, a visual representation 310*a*-*b* can include a description of a storyline.

The storylines corresponding to the visual representations 210*a*-210*b* can include any storyline associated with a user of the client device, such as one or more storylines created or contributed to by the user, one or more storylines associated with one or more contacts of the user, one or more storylines that the user has subscribed to and/or followed, etc. In one implementation, the storylines corresponding to the visual representations 210*a*-210*b* can include one or more storylines that have been updated during a given period of time (e.g., last hour, last three hours, last week, etc.).

In some implementations, upon detecting a user interaction with one or more UI elements corresponding to a particular storyline (e.g., a user selection of a visual representation of the particular storyline), the client device can transmit a request for content related to the particular storyline to a server device. Similarly, upon detecting a user input initiating creation of a new storyline (e.g., a user selection of button 220*a* or 220*b*), the client device can transmit a request to create a storyline to the server device.

Figure 3:
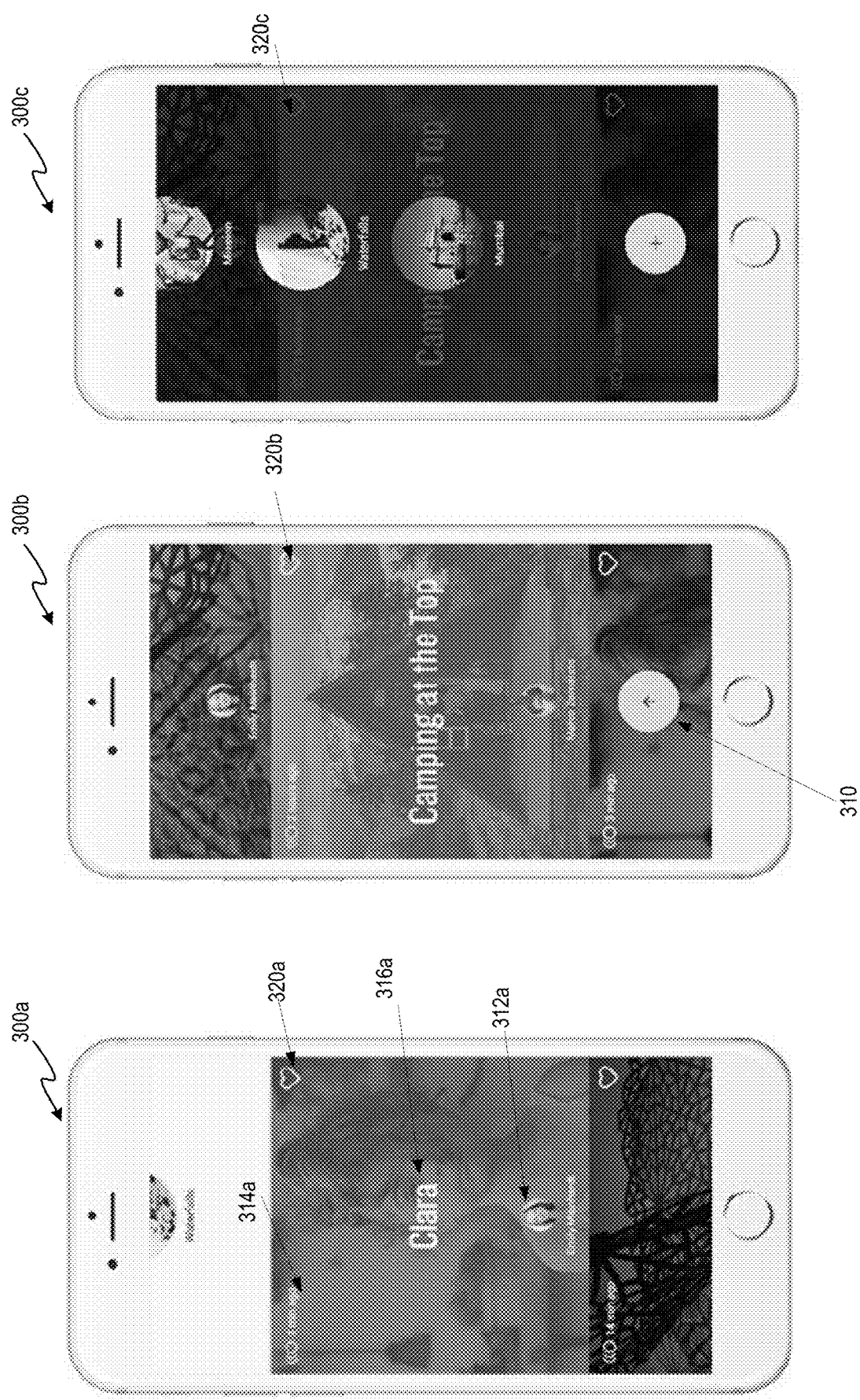

FIG. 3 illustrates examples 300*a*, 300*b*, and 300*c* of user interfaces 300*a*, 300*b*, and 300*c* for providing information related to storylines in accordance with some implementations of the disclosure. User interfaces 300*a*, 300*b*, and 300*c* can be accessed by a user to browse storyline content (e.g., to see what video clips are included in a storyline or to see what storylines the user has created and/or is following).

As illustrated, each of user interfaces 300*a*, 300*b*, and 300*c* can present any information related to one or more storylines, such as a description of each of the storylines, the time when each of the storylines was updated, information related to one or more users associated with the storylines (e.g., users that created, edited, etc. the storylines), etc. This information can be presented using any content, such as text, images, graphics, etc. For example, user interface 300*a* displays storyline name 316*a*, image and name 312*a* of the user that created the storyline, and time 314*a* when the storyline was created.

One or more of user interfaces 300*a-c* can be presented on the client device in response to detecting a user input, such as a user gesture (e.g., a "swipe" gesture, a "scroll" gesture, etc.), a selection of icon 310, etc. In another example, the user can recommend (e.g., "like") a given storyline by selecting a corresponding "like" icon 320*a*, 320*b*, or 320*c*.

FIG. 4 illustrates examples 400*a*, 400*b*, and 400*c* of user interfaces 400*a*, 400*b*, and 400*c* for presenting information related to a storyline in accordance with some implementations of the disclosure are shown. A user can access any of the user interfaces 400*a*, 400*b*, and 400*c* to watch (play) one or more video clips from a storyline.

As illustrated, each of user interfaces 400*a*, 400*b*, and 400*c* can provide any information related to the storyline, such as a description of the storyline, information related to video content associated with the storyline (e.g., images representative of one or more content items associated with the storyline), information related to one or more users associated with the storyline (e.g., an image or other representation of a user that creates, follows, etc. the storyline), etc.

Each of user interfaces 400*a*, 400*b*, and 400*c* can include a content player 410*a-c* for providing playback of content items associated with the storyline, such as one or more images, video segments, etc.

Each of user interfaces 400*a*, 400*b*, and 400*c* can also include one or more user interface (UI) elements 420*a*-420*c* for controlling playback of content within the content player 410*a-c*. As an example, UI elements 420*a*-420*c* can include visual representations of one or more content items associated with the storyline. Each of the visual representations may include an image and/or any other content. The user may browse the images by swiping the screen of the client device and/or using any other gesture. The user may also select one or more content items associated with the storyline by selecting one or more UI elements 420*a*-420*c* corresponding to the video segments. For example, as shown in FIG. 4, user interface 400*b* can visually illustrate that a given content segment has been selected for playback (e.g., using highlighted image 422, highlighted description of the selected video segment, or any other visual indicator). As another example, user interface 400*c* can visually illustrate that multiple video segments have been selected for playback using highlighted images 424 or any other visual indicator.

As another example, user interface 400*a*-400*c* can include one or more playback control components for controlling (e.g., playing, rewinding, forwarding, pausing, etc.) playback of video content in the content player 410*a-c*. In one implementation, the playback control components include a "play" button 430*a* for initiating playback of the video content, a "pause" button 430*b* for pausing playback of the video content, etc.

Figure 5A:
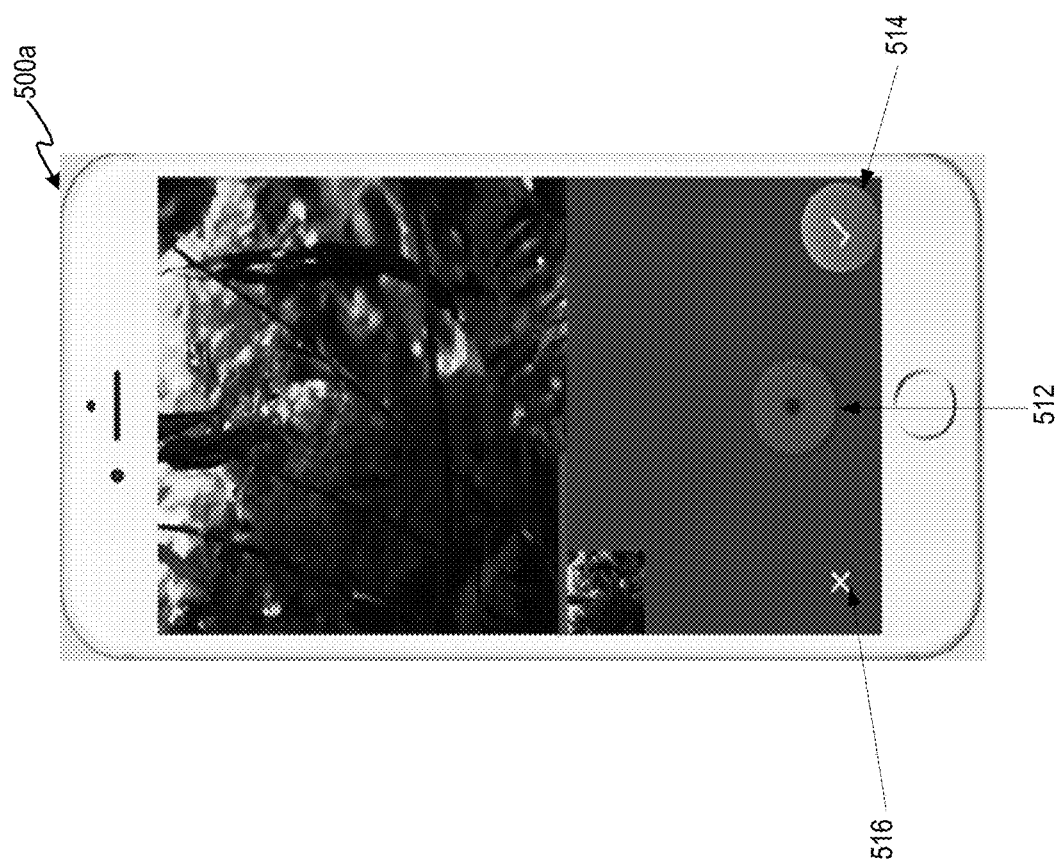
Figure 5B:
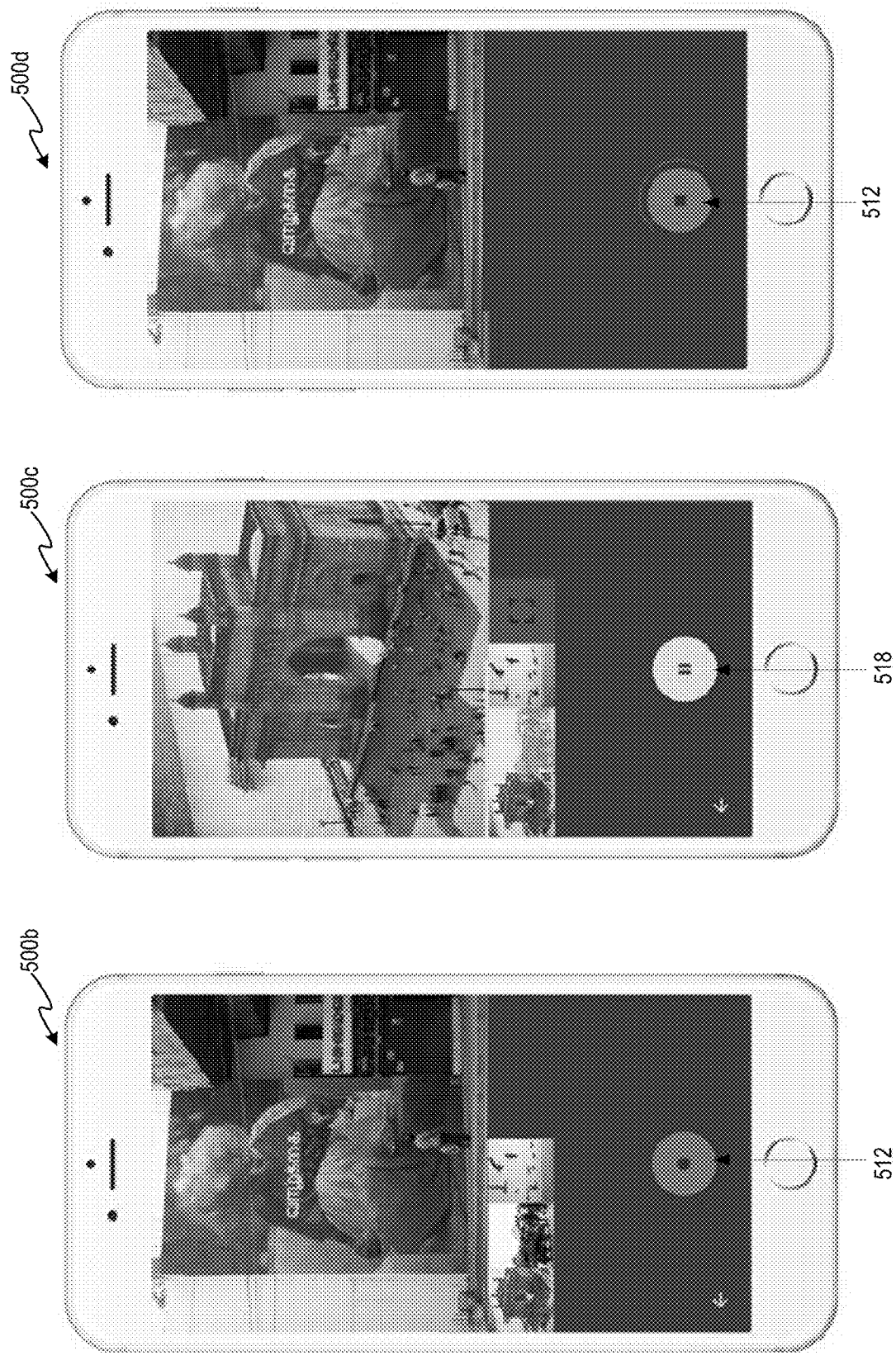

Turning to FIGS. 5A and 5B, example screenshots of user interfaces 500*a*, 500*b*, 500*c*, and 500*d* for generating content items for a storyline in accordance with some implementations of the disclosure are shown. The user can add a video clip to a storyline by selecting button 514. Alternatively, the user can cancel the addition of the video clip to the storyline by selecting button 516. The user may initiate generation of a content item (e.g., recording of video content) by selecting a "record" button 512 and can stop the recording by re-selecting record button 512 (shown as "pause" button 518 in FIG. 5B). In one implementation, the recording will automatically stop after a predetermined period of time (e.g., a few seconds, a few minutes, etc.). If not storyline has been previously specified, the user can initiate the creation of the storyline by selecting button 514. Alternatively, the user can cancel the creation of the storyline by selection button 516.

Turning to FIG. 6, example screenshots of user interfaces 600*a* and 600*b* for associating additional content to a storyline in accordance with some implementations of the disclosure are shown.

As illustrated, user interface 600*a* presents information related to a storyline, such as a description of the storyline, one or more images related to the storyline, etc. User interface 600*a* can also include an "add" button 610 for associating additional content with the storyline. In some implementations, user interface 600*a* can further include a UI element (e.g., a button) 612 to add additional users to share the identifier (e.g., a URL or name) of the storyline with, in order to allow the additional users to contribute to the storyline.

In response to receiving a user request to associate additional content with the storyline (e.g., a user selection of button 610, a voice command, a gesture, etc.), the storyline application 111 can present user interface 600*b* on the client device. The user may then initiate recording and/or generation of additional content by selecting a "record" button 620. The user may stop the recording by re-selecting "record" button 620. In some implementations, the user may associate one or more content items (e.g., one or more images, video segments, etc.) to the storyline.

In one implementation, one or more visual representations 630 of the recorded content may be generated and presented. The user may select a visual representation 630 corresponding to the recorded content to review the recorded content. The user may also indicate that the recorded content is to be associated with the storyline by selecting a "confirm" button 640. Alternatively, the user may indicate that the recorded content is not to be associated with the storyline by selecting a "cancel" button 650.

Figure 7:
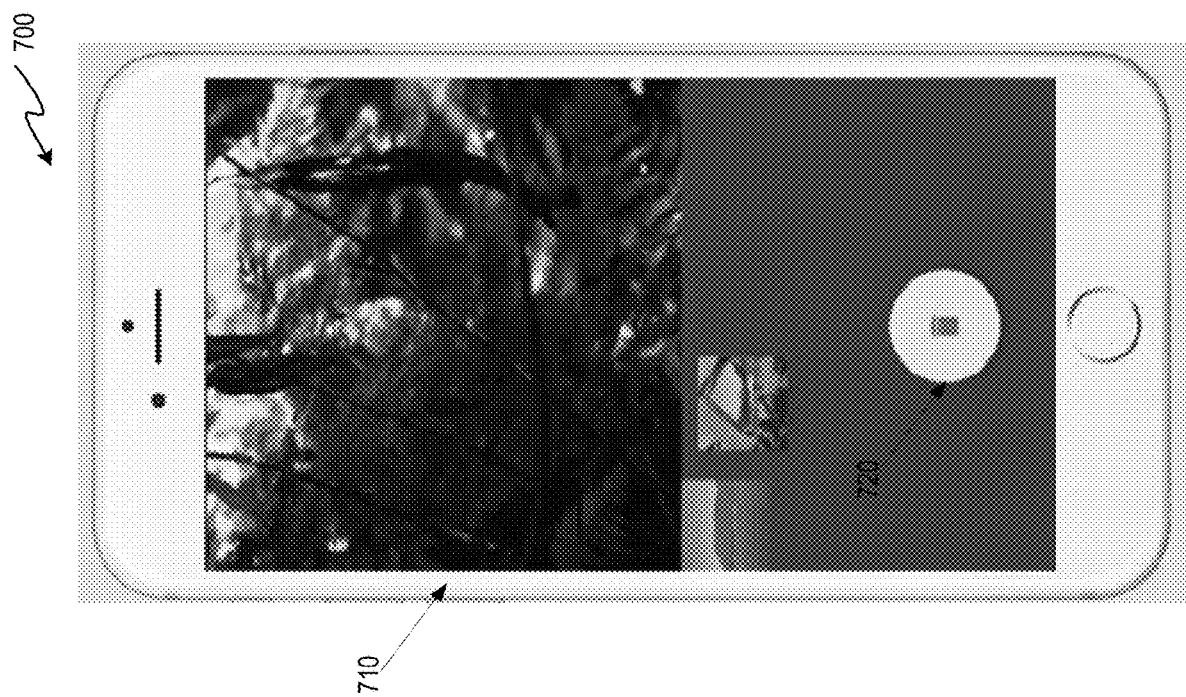

Turning to FIG. 7, an example screenshot of user interface 700 for editing content associated with a storyline in accordance with some implementations of the disclosure are shown. As illustrated, user interface 700 can include one or more visual representations 710 of content associated with the storyline. In one example, each of visual representations 710 represent a content item (e.g., an image, a video segment, etc.) associated with the storyline.

User interface 700 can also include a "delete" option 720. The user may remove a given content item from the storyline by selecting a visual representation corresponding to the given content item and icon 720. Alternatively or additionally, the user can remove the given content item using one or more gestures, such as moving (e.g., dragging) the visual representation corresponding to the given content item toward icon 720 or any other portion of user interface 700.

Figure 8:

Turning to FIG. 8, example screenshots of user interfaces 800*a* and 800*b* for presenting content associated with a storyline in accordance with some implementations of the disclosure are shown.

As illustrated, user interface 800*a* can present any information related to one or more storylines, such as descriptions of the storylines, information related to users that create/contribute to the storylines, images related to the storylines, etc. In one example, user interface 800 can include visual representations 812, 814, and 816, each of which can correspond to a storyline. Each of visual representations 812, 814, and 816 can include any information related to a storyline and can include any content (e.g., text, one or more images, video content, audio content, graphics, etc.). In one example, each of the visual representations can include an image (e.g., a thumbnail image) representative of a storyline.

The storyline application 111 may present user interface 800*b* on the client device in response to receiving a user request to present information about multiple storylines (e.g., the storylines that the user has followed). As shown in FIG. 8, user interface 800*b* can present information related to a user associated with the storyline, such as an image 822 or any other visual representation of the user, a user name of the user, etc. User interface 800*b* can also include one or more images 824 corresponding to one or more content items (e.g., images, video segments, composite videos, etc.) associated with the user. For example, each of the content items can be associated with a storyline related to the user and can include content that has not been consumed by the user. A storyline related to the user can include a storyline that is created or contributed to by the user, a storyline that is followed by the user, a storyline that has been edited by the user, etc.

User interface 800*b* can also include a content player 830 for playback of the content items corresponding to images 824. In some implementations, the content items can be played in a predetermined order (e.g., by upload date). Playback of content in content player 830 can be initiated in any manner. In one implementation, the user can initiate playback of content associated with the storyline in a content player 830 using one or more gestures (e.g., swiping towards a direction) or any other user input. In another implementation, one or more content items associated with the storyline can be presented (e.g., played) in content player 830 automatically in response to a given event (e.g., presentation of use interface 800*b* on the client device).

Figure 9A:
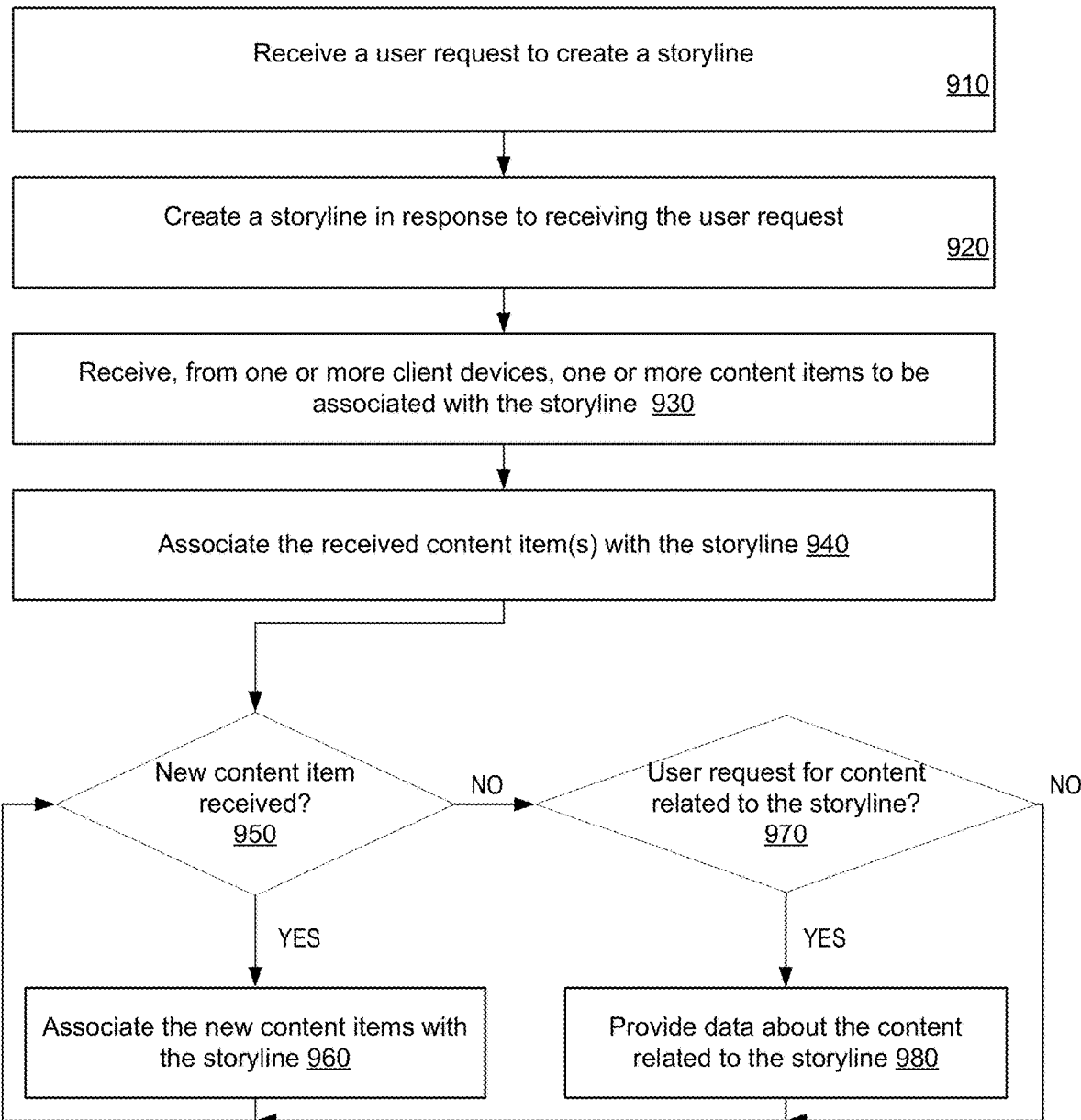
FIG. 9A is a flow diagram illustrating a server-side method for creating storyline content, according to some implementations of the disclosure.

FIG. 9A is a flow diagram illustrating a server-side method 900 for creating a storyline by a server device, according to some implementations of the disclosure. FIG. 9B is a flow diagram illustrating a client-side method 950 for creating a storyline by a server device, according to some implementations of the disclosure. Methods may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 9A, method 900 may be performed by a processing device of a server 130 as shown in FIG. 1. Method 900 begins at block 910 when the processing device receives a user request to create a storyline. In one example, the user request can include any information related to the storyline, such as a description, an image, and/or any information provided by a user that initiated the user request. In another example, the user request can include any identifying information related to the user that initiated the creation of the storyline, such as a user identifier, a channel identifier, a user account identifier, etc.

At block 920, the processing device can create a storyline in response to receiving the user request. As an example, the processing device generates an identifier that corresponds to the storyline (also referred to as "storyline identifier"), which can be a URL, a name, a unique numeric identifier, etc. The processing device can also store any other information related to the storyline in association with the storyline identifier.

At block 930, the processing device can receive, from one or more client devices, one or more content items to be associated with the storyline. The content items can include one or more images, video clips, audio clips, etc. In some implementations, the content items can be received along with the user request to create the storyline. The client devices can be associated with one or more users, such as the user that initiated the creation of the storyline, other users that contribute to the storyline, one or more contacts of the user that initiated the creation of the storyline, one or more contacts of the other users that contribute to the storyline, one or more users that have followed the storyline, etc.

At block 940, the processing device can associate the received content item(s) with the storyline. For example, the processing device stores information related to the content item(s) in association with the storyline identifier and/or any other information related to the storyline. Examples of the information related to the content item(s) include a content identifier that uniquely identifies the content item(s) (e.g., a URL, a video identifier, etc.), data that can be used to provide playback of the content item(s) (e.g., audio data, video data, metadata, etc.), etc. In some implementations, the processing device can associate each received content item with the storyline by adding the storyline identifier to the metadata of the content item (e.g., tagging the content item with the storyline identifier).

At block 950, the processing device can determine whether a new content item to be associated with the storyline has been received. The new content items can be received from one or more client devices of any user (e.g., the user that initiates the creation of the storyline, any other collaborator of the storyline, a user that follows the storyline, etc.).

In response to determining that the new content item has been received, the processing device can proceed to block 960 and can associate the new content item with the storyline. Alternatively, the processing device can proceed to block 970 and can determine whether a request for content related to the storyline has been received. In response to receiving the request, the processing device can provide data for use to present content related to the storyline. For example, the processing device can identify a user that initiated the request (e.g., using a user identifier). The processing device can also determine one or more content items that are associated with the storyline and that have not been consumed by the user. As another example, the processing device can also determine one or more storylines associated with the user, such as storylines that are created by the user, storylines that are followed by the user, storylines that are created by contacts of the user, etc. The processing device then determines one or more content items associated with the determined storylines, such as one or more items that have not been consumed by the user. Additionally, the processing device can determine a playback order for the content items (e.g., based on the upload dates of the content items).

The processing device can then provide the storyline information with data about the determined content items, such as audio data, video data, information that can be used to determine a playback order of the content items, and/or any other data that can be used to provide playback of the content items in a predetermined order (e.g., by upload date).

Referring to FIG. 9B, method 985 may be performed by a processing device of a client device 110 as shown in FIG. 1. Method 995 begins at block 992 when the processing device provides, on a mobile device, a storyline content UI for adding video content to a storyline (e.g., UIs 500*a*, 500*b*, 500*c*, 500*d* shown in FIGS. 5A and 5B). The storyline content UI can have a first area including a media player, a second area including visual representations of video clips from the storyline, and a third area including a first UI element (e.g., button 512 of FIG. 5A) to record video content, and a second UI element (e.g., button 514 of FIG. 5A) to add the recorded video content to the storyline. In some implementations, the third area may also include a third UI element to add more collaborators to the storyline.

At block 994, in response to a user activation of the first UI element, the processing device initiates recording of a new video clip using the first area, creates a visual representation of the new video clip, and adds the visual representation of the new video clip to the second area. These operations are illustrated in UIs 500*a*, 500*b*, 500*c*, 500*d* of FIGS. 5A and 5B. In some implementations, the processing device monitors the duration of the new video clip being recorded, and stops the recording of the new video clip in response to determining that the duration of the new video clip has reached a predetermined threshold. In some other implementations, the processing device stops the recording of the new video clip in response to a user re-activation of the first UI element.

At block 996, in response to a user activation of the second UI element, the processing device causes the new video clip to be associated with the storyline (e.g., by sending an association request to the server). In one implementation, the third area further includes a fourth UI element (e.g., button 516 in FIG. 5A) to remove a video clip from the storyline.

At block 998, in response to a user selection of the visual representation of the new video clip, processing device plays the new video clip in the first area.

At block 999, in response to a user activation of the third UI element, the processing device can send a user request to add more collaborators to the server to cause sharing of the storyline identifier with these collaborators.

The processing device can also present, to the user, a home screen UI (e.g., UI 200*a*, 200*b* of FIG. 2) including visual representations of storylines of the user and visual representations of additional storylines to which the user has subscribed. In one implementation, the processing device can receive a user selection of a storyline on the home screen UI, and can play video clips of the selected storyline in the storyline content UI (e.g., UI 400*a*, 400*b*, 400*c* of FIG. 4). The video clips can be played sequentially (automatically one after another) using the order in which the video clips were created or uploaded. In some implementations, only the video clips that were not previously viewed by the user can be played, and optionally visual representations of the video clips that were previously viewed by the user can be highlighted or otherwise graphically identified.

In some implementations, a user can be provided, via an update UI, with updates on storylines to which the user has subscribed. The updates can identify new video clips that have been added to the storylines since the last time the user viewed the update UI. The new video clips that have been added to the storylines can be played in the update UI automatically (without any user interaction) in a sequential order.

Figure 10:
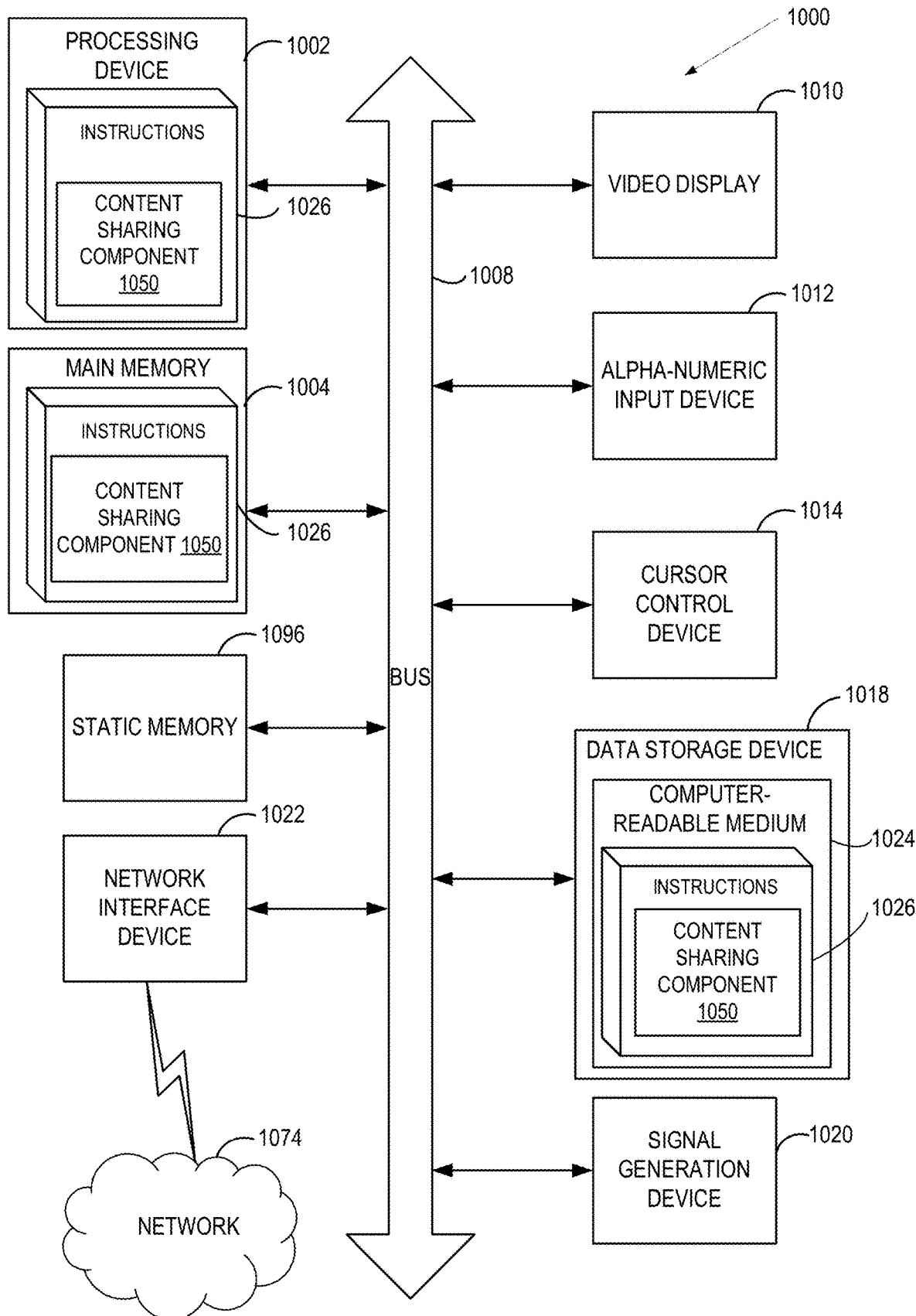
FIG. 10 is a block diagram illustrating an exemplary computer system, according to some implementations.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 802 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 802 is configured to execute instructions 1026 for performing the operations and steps discussed herein.

The computer system 1000 may further include a network interface device 1022. The computer system 1000 also may include a video display unit 810 (e.g., a liquid crystal display (LCD), a cathode ray tube (CRT), or a touch screen), an alphanumeric input device 1012 (e.g., a keyboard), a cursor control device 1014 (e.g., a mouse), and a signal generation device 1020 (e.g., a speaker).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 802 also constituting computer-readable storage media. The instructions 1026 may further be transmitted or received over a network 1074 via the network interface device 1022.

In one embodiment, the instructions 1026 include instructions for a content item player component 1050, which may correspond, respectively, to storyline application 111 and/or storyline component 140 described with respect to FIG. 1, and/or a software library containing methods that provide a dynamic size-adjustable content item player for a content sharing platform. While the computer-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
providing, on a mobile device, a storyline content user interface (UI) for adding video content to a storyline, the storyline content UI having a first area allowing video playback, a second area to present visual representations of a plurality of video clips of a plurality of storylines, and a third area including a first UI element to allow video content recording, wherein each video clip of the plurality of video clips is associated with one or more storylines;
in response to a user activation of the first UI element, allowing recording of a new video clip to be initiated;
determining that a duration of the new video clip satisfies a predetermined threshold;
creating, by a processing device, a visual representation of the new video clip;
associating the new video clip with an additional storyline, the associating comprising adding an identifier of the additional storyline to metadata of the new video clip;
adding the visual representation of the new video clip to the second area; and
in response to a user selection of one of the plurality of storylines, playing, in a predetermined order one after another in the storyline content UI on the mobile device, video clips of the plurality of storylines, the video clips comprising the new video clip of the additional storyline and at least one video clip of the plurality of video clips of the plurality of storylines based on metadata of the at least one video clip including an identifier of one of the plurality of the storylines.

2. The method of claim 1 further comprising:
monitoring the duration of the new video clip being recorded; and
limiting the duration of the new video clip and a duration of each subsequent video clip to the predetermined threshold.

3. The method of claim 1 further comprising:
stopping the recording of the new video clip in response to a user re-activation of the first UI element.

4. The method of claim 1 further comprising:
providing a second UI element to add the new video clip to the additional storyline.

5. The method of claim 1 further comprising:
providing a third UI element to add one or more additional users to the additional storyline; and
causing an identifier of the additional storyline to be shared with the one or more additional users in response to a user activation of the third UI element, wherein sharing the identifier of the additional storyline allows the one or more additional users to contribute to the storyline.

6. The method of claim 1 further comprising:
receiving a user request to share the additional storyline with one or more other users; and
presenting information about the additional storyline to the one or more other users.

7. The method of claim 1 wherein the plurality of storylines include one or more storylines of the user and one or more storylines of other users to which the user has subscribed.

8. The method of claim 1 wherein the predetermined order is an order in which the video clips were created.

9. The method of claim 1 wherein playing, in the predetermined order one after another in the storyline content UI on the mobile device, the video clips of the plurality of storylines comprises:
playing one or more of the plurality of video clips that were not previously viewed by the user.

10. The method of claim 7 further comprising:
providing, in an update UI, updates on the plurality of storylines of the other users to which the user has subscribed.

11. A system for a mobile device, comprising:
a memory; and
a processing device, coupled to the memory, to:
provide, on a mobile device, a storyline content user interface (UI) for adding video content to a storyline, the storyline content UI having a first area allowing video playback, a second area to present visual representations of a plurality of video clips of a plurality of storylines, and a third area including a first UI element to allow video content recording, wherein each video clip of the plurality of video clips is associated with one or more storylines;
in response to a user activation of the first UI element, allow recording of a new video clip to be initiated;
determine that a duration of the new video clip satisfies a predetermined threshold;
create a visual representation of the new video clip;
associate the new video clip with an additional storyline, the associating comprising adding an identifier of the additional storyline to metadata of the new video clip;
add the visual representation of the new video clip to the second area; and
in response to a user selection of one of the plurality of storylines, play, in a predetermined order one after another in the storyline content UI on the mobile device, video clips of the plurality of storylines, the video clips comprising the new video clip of the additional storyline and at least one video clip of the plurality of video clips of the plurality of storylines based on metadata of the at least one video clip including an identifier of one of the plurality of the storylines.

12. The system of claim 11 wherein the processing device is further to:
monitor the duration of the new video clip being recorded; and
limit the duration of the new video clip and a duration of each subsequent video clip to the predetermined threshold.

13. The system of claim 11 wherein the processing device is further to:
stop the recording of the new video clip in response to a user re-activation of the first UI element.

14. The system of claim 11 wherein the processing device is further to:
provide a second UI element to add the new video clip to the additional storyline.

15. The system of claim 11 wherein the processing device is further to:
provide a third UI element to add one or more additional users to the additional storyline; and
cause an identifier of the additional storyline to be shared with the one or more additional users in response to a user activation of the third UI element, wherein sharing the identifier of the additional storyline allows the one or more additional users to contribute to the storyline.

16. The system of claim 11 wherein the processing device is further to:
  receive a user request to share the additional storyline with one or more other users; and
  present information about the additional storyline to the one or more other users.

17. The system of claim 11 wherein the plurality of storylines include one or more storylines of the user and one or more storylines of other users to which the user has subscribed.

18. The system of claim 11 wherein the predetermined order is an order in which the video clips were created.

19. A non-transitory computer-readable medium comprising instructions, which when executed by a processing device, cause the processing device to perform operations comprising:
  providing, on a mobile device, a storyline content user interface (UI) for adding video content to a storyline, the storyline content UI having a first area allowing video playback, a second area to present visual representations of a plurality of video clips of a plurality of storylines, and a third area including a first UI element to allow video content recording, wherein each video clip of the plurality of video clips is associated with one or more storylines;
  in response to a user activation of the first UI element, allowing recording of a new video clip to be initiated;
  determining that a duration of the new video clip satisfies a predetermined threshold;
  creating a visual representation of the new video clip;
  associating the new video clip with an additional storyline, the associating comprising adding an identifier of the additional storyline to metadata of the new video clip;
  adding the visual representation of the new video clip to the second area; and
  in response to a user selection of one of the plurality of storylines, playing, in a predetermined order one after another in the storyline content UI on the mobile device, video clips of the plurality of storylines, the video clips comprising the new video clip of the additional storyline and at least one video clip of the plurality of video clips of the plurality of storylines based on metadata of the at least one video clip including an identifier of one of the plurality of the storylines.

20. The non-transitory computer-readable medium of claim 19 wherein the operations further comprise:
  monitoring the duration of the new video clip being recorded; and
  limiting the duration of the new video clip and a duration of each subsequent video clip to the predetermined threshold.

* * * * *